US012804617B2

(12) United States Patent
Li et al.

(10) Patent No.: US 12,804,617 B2
(45) Date of Patent: Nov. 17, 2026

(54) DUPLICATING SIDELINK TRANSMISSIONS FOR SIDELINK CARRIER AGGREGATION

(71) Applicant: QUALCOMM Incorporated, San Diego, CA (US)

(72) Inventors: Qing Li, Princeton Junction, NJ (US); Hong Cheng, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 17/805,433

(22) Filed: Jun. 3, 2022

(65) Prior Publication Data

US 2023/0397170 A1 Dec. 7, 2023

(51) Int. Cl.
*H04W 72/044* (2023.01)
*H04L 1/1812* (2023.01)
*H04L 5/00* (2006.01)

(52) U.S. Cl.
CPC ......... *H04W 72/044* (2013.01); *H04L 1/1812* (2013.01); *H04L 5/001* (2013.01)

(58) Field of Classification Search
None
See application file for complete search history.

(56) References Cited

U.S. PATENT DOCUMENTS 12,016,009 B2 * 6/2024 Yang .................. H04W 72/535
2019/0158993 A1 * 5/2019 Kwon .................. H04L 1/1893
2019/0239112 A1 * 8/2019 Rao .......................... H04L 1/08
2020/0084659 A1 * 3/2020 Pan ....................... H04W 28/06
2020/0146082 A1 * 5/2020 Chen ........................ H04W 4/40
2021/0105788 A1 * 4/2021 Kim ...................... H04W 76/10
2021/0153065 A1 * 5/2021 Adjakple .............. H01M 4/134
2021/0211850 A1 * 7/2021 Yang ........................ H04W 4/40
2021/0219299 A1 * 7/2021 Peng ........................ H04W 4/50
2021/0227620 A1 * 7/2021 Pan .......................... H04W 4/40
2021/0227621 A1 * 7/2021 Pan ................... H04W 72/0446
2021/0297901 A1 * 9/2021 Tang ........................ H04L 1/189
2022/0150908 A1 * 5/2022 Ji .......................... H04L 5/0055
2022/0191733 A1 * 6/2022 Ali ...................... H04L 41/0806
2023/0139122 A1 * 5/2023 Park .................. H04W 28/0268
370/328

(Continued)

FOREIGN PATENT DOCUMENTS

EP 3829198 A1 6/2021

OTHER PUBLICATIONS

International Search Report and Written Opinion—PCT/US2023/021895—ISA/EPO—Aug. 25, 2023.

*Primary Examiner* — Khaled M Kassim
*Assistant Examiner* — Shima Wasel
(74) *Attorney, Agent, or Firm* — QUALCOMM Incorporated

(57) ABSTRACT

Various aspects of the present disclosure generally relate to wireless communication. In some aspects, a first user equipment (UE) may transmit, to a second UE, duplicated transmissions of a sidelink transmission on a plurality of component carriers based at least in part on a cast type associated with the sidelink transmission and one or more indications received from an upper layer of the first UE, wherein the duplicated transmissions are associated with the plurality of component carriers associated with a layer 2 (L2) destination identifier (ID) of the sidelink transmission. Numerous other aspects are described.

18 Claims, 11 Drawing Sheets

(56) References Cited

U.S. PATENT DOCUMENTS

| | | | | |
|---|---|---|---|---|
| 2024/0276595 | A1* | 8/2024 | Blasco Serrano | H04W 76/14 |
| 2024/0340651 | A1* | 10/2024 | Luo | H04W 72/02 |
| 2024/0389125 | A1* | 11/2024 | Li | H04W 4/46 |
| 2025/0023699 | A1* | 1/2025 | Leng | H04W 76/00 |
| 2025/0031229 | A1* | 1/2025 | Leng | H04W 72/20 |

* cited by examiner

DUPLICATING SIDELINK TRANSMISSIONS FOR SIDELINK CARRIER AGGREGATION

FIELD OF THE DISCLOSURE

Aspects of the present disclosure generally relate to wireless communication and to techniques and apparatuses for duplicating sidelink transmissions for sidelink carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first user equipment (UE) includes a memory and one or more processors, coupled to the memory, configured to: transmit, to a second UE, duplicated transmissions of a sidelink transmission on a plurality of component carriers based at least in part on a cast type associated with the sidelink transmission and one or more indications received from an upper layer of the first UE, wherein the duplicated transmissions are associated with the plurality of component carriers associated with a layer 2 (L2) destination identifier (ID) of the sidelink transmission.

In some implementations, an apparatus for wireless communication at a second UE includes a memory and one or more processors, coupled to the memory, configured to: receive, from a first UE, duplicated transmissions of a sidelink transmission on a plurality of component carriers based at least in part on: a cast type associated with the sidelink transmission, and one or more indications received from an upper layer of the second UE, and the one or more indications support sidelink carrier aggregation, wherein the duplicated transmissions are associated with the plurality of component carriers associated with an L2 destination ID of the sidelink transmission.

In some implementations, a method of wireless communication performed by a first UE includes transmitting, to a second UE, duplicated transmissions of a sidelink transmission on a plurality of component carriers based at least in part on a cast type associated with the sidelink transmission and one or more indications received from an upper layer of the first UE, wherein the duplicated transmissions are associated with the plurality of component carriers associated with an L2 destination ID of the sidelink transmission.

In some implementations, a method of wireless communication performed by a second UE includes receiving, from a first UE, duplicated transmissions of a sidelink transmission on a plurality of component carriers based at least in part on: a cast type associated with the sidelink transmission, and one or more indications received from an upper layer of the second UE, and the one or more indications support sidelink carrier aggregation, wherein the duplicated transmissions are associated with the plurality of component carriers associated with an L2 destination ID of the sidelink transmission.

In some implementations, a non-transitory computer-readable medium storing a set of instructions for wireless communication includes one or more instructions that, when executed by one or more processors of a first UE, cause the first UE to: transmit, to a second UE, duplicated transmissions of a sidelink transmission on a plurality of component carriers based at least in part on a cast type associated with the sidelink transmission and one or more indications received from an upper layer of the first UE, wherein the duplicated transmissions are associated with the plurality of component carriers associated with an L2 destination ID of the sidelink transmission.

In some implementations, a non-transitory computer-readable medium storing a set of instructions for wireless communication includes one or more instructions that, when executed by one or more processors of a second UE, cause the second UE to: receive, from a first UE, duplicated transmissions of a sidelink transmission on a plurality of component carriers based at least in part on: a cast type associated with the sidelink transmission, and one or more indications received from an upper layer of the second UE, and the one or more indications support sidelink carrier aggregation, wherein the duplicated transmissions are associated with the plurality of component carriers associated with an L2 destination ID of the sidelink transmission.

In some implementations, a first apparatus for wireless communication includes means for transmitting, to a second apparatus, duplicated transmissions of a sidelink transmission on a plurality of component carriers based at least in part on a cast type associated with the sidelink transmission and one or more indications received from an upper layer of the first apparatus, wherein the duplicated transmissions are associated with the plurality of component carriers associated with an L2 destination ID of the sidelink transmission.

In some implementations, a second apparatus for wireless communication includes means for receiving, from a first apparatus, duplicated transmissions of a sidelink transmission on a plurality of component carriers based at least in part on: a cast type associated with the sidelink transmission, and one or more indications received from an upper layer of the second apparatus, and the one or more indications support sidelink carrier aggregation, wherein the duplicated transmissions are associated with the plurality of component carriers associated with an L2 destination ID of the sidelink transmission.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
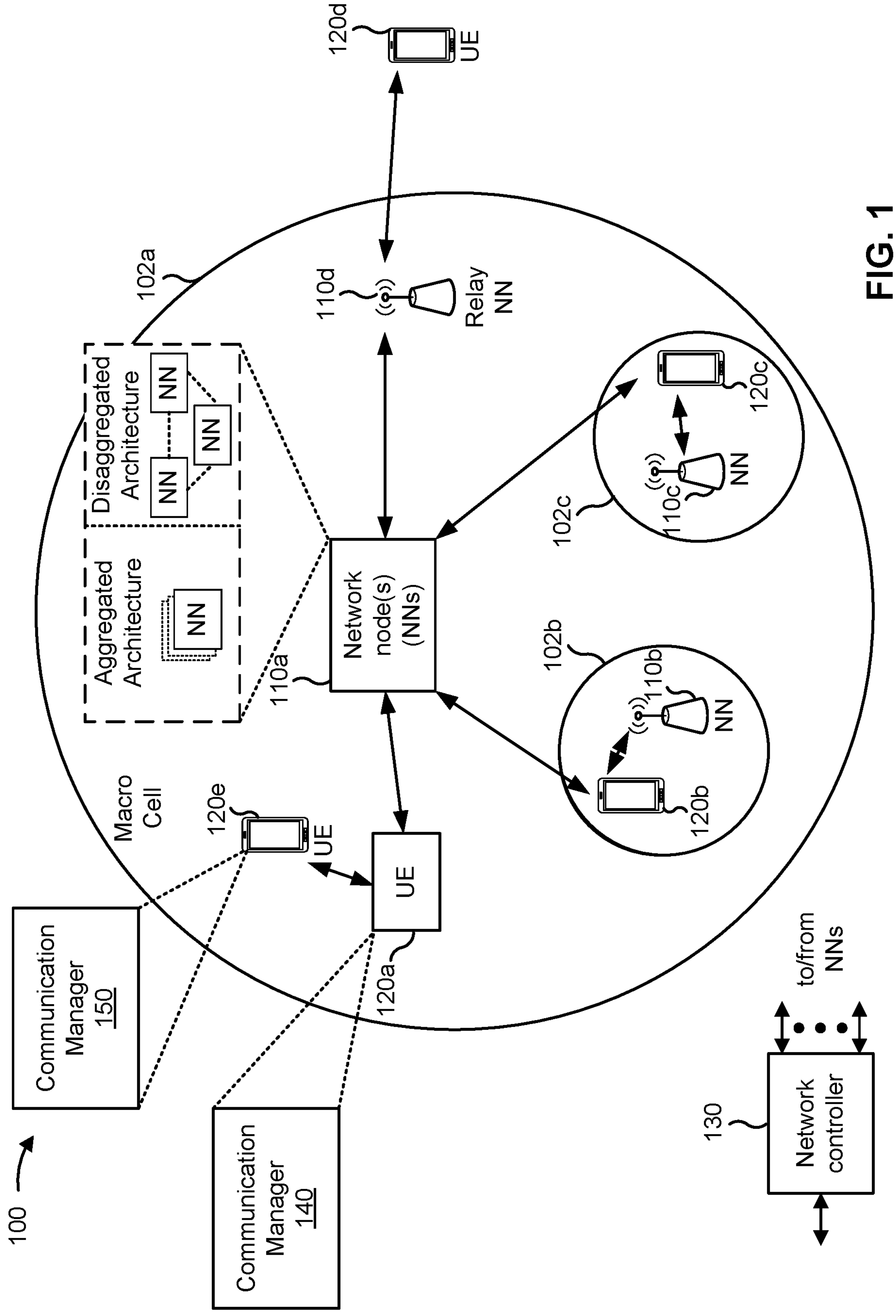
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120*a*) may include a communication manager 140. As described in more detail elsewhere herein, the communication manager 140 may transmit, to a second UE, duplicated transmissions of a sidelink transmission on a plurality of component carriers based at least in part on a cast type associated with the sidelink transmission and one or more indications received from an upper layer of the first UE, wherein the duplicated transmissions are associated with the plurality of component carriers associated with a layer 2 (L2) destination identifier (ID) of the sidelink transmission. Additionally, or alternatively, the communication manager 140 may perform one or more other operations described herein.

In some aspects, a second UE (e.g., UE 120*e*) may include a communication manager 150. As described in more detail elsewhere herein, the communication manager 150 may receive, from a first UE, duplicated transmissions of a sidelink transmission on a plurality of component carriers based at least in part on: a cast type associated with the sidelink transmission, and one or more indications received from an upper layer of the second UE, and the one or more indications support sidelink carrier aggregation, wherein the duplicated transmissions are associated with the plurality of component carriers associated with an L2 destination ID of the sidelink transmission. Additionally, or alternatively, the communication manager 150 may perform one or more other operations described herein.

As indicated above, FIG. 1 is provided as an example. Other examples may differ from what is described with regard to FIG. 1.

Figure 2:
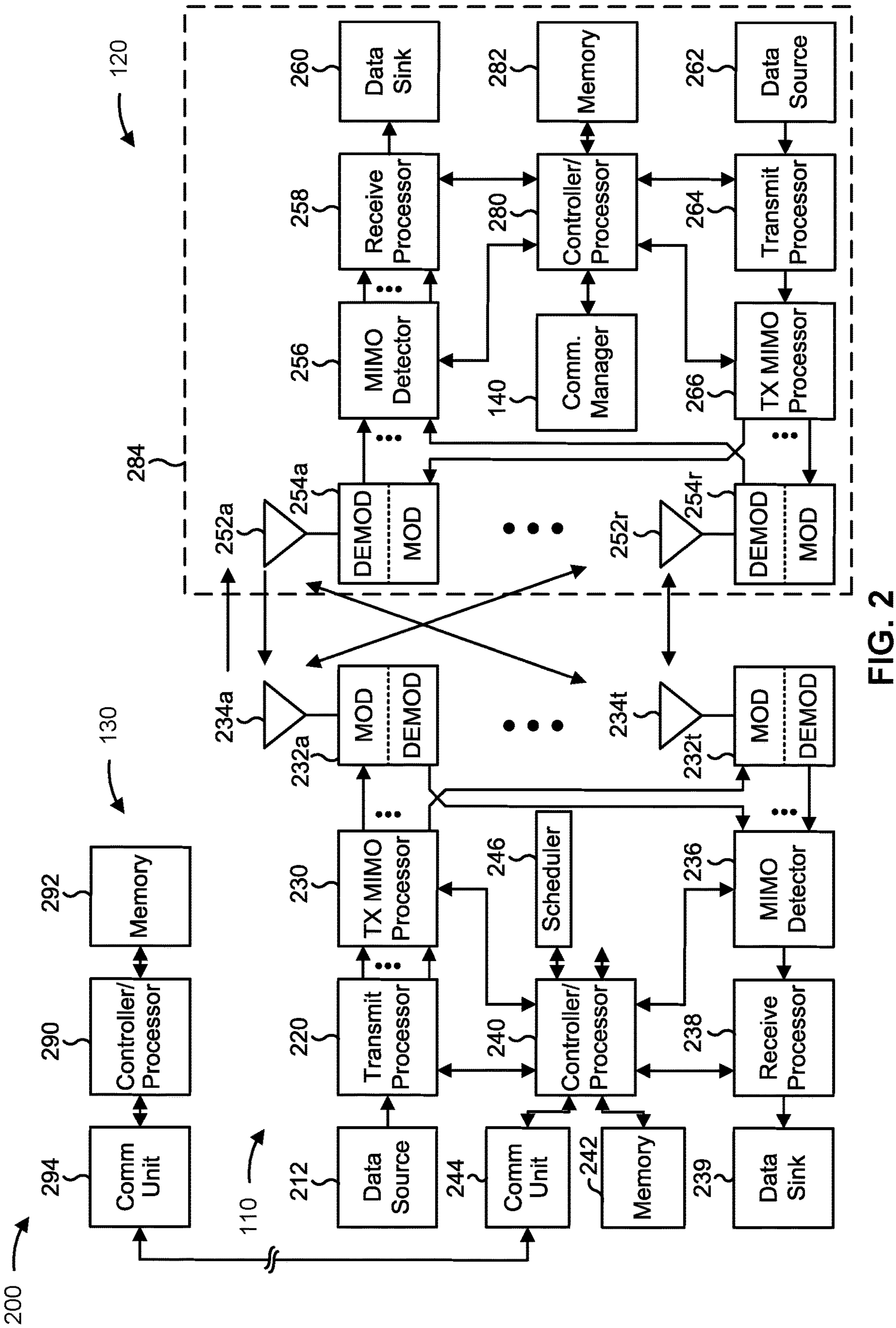
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term “controller/processor” may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with duplicating sidelink transmissions for sidelink carrier aggregation, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first UE (e.g., UE 120*a*) includes means for transmitting, to a second UE, duplicated transmissions of a sidelink transmission on a plurality of component carriers based at least in part on a cast type associated with the sidelink transmission and one or more indications received from an upper layer of the first UE, wherein the duplicated transmissions are associated with the plurality of component carriers associated with an L2 destination ID of the sidelink transmission. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., UE 120*e*) includes means for receiving, from a first UE, duplicated transmissions of a sidelink transmission on a plurality of component carriers based at least in part on: a cast type associated with the sidelink transmission, and one or more indications received from an upper layer of the second UE, and the one or more indications support sidelink carrier aggregation, wherein the duplicated transmissions are associated with the plurality of component carriers associated with an L2 destination ID of the sidelink transmission. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
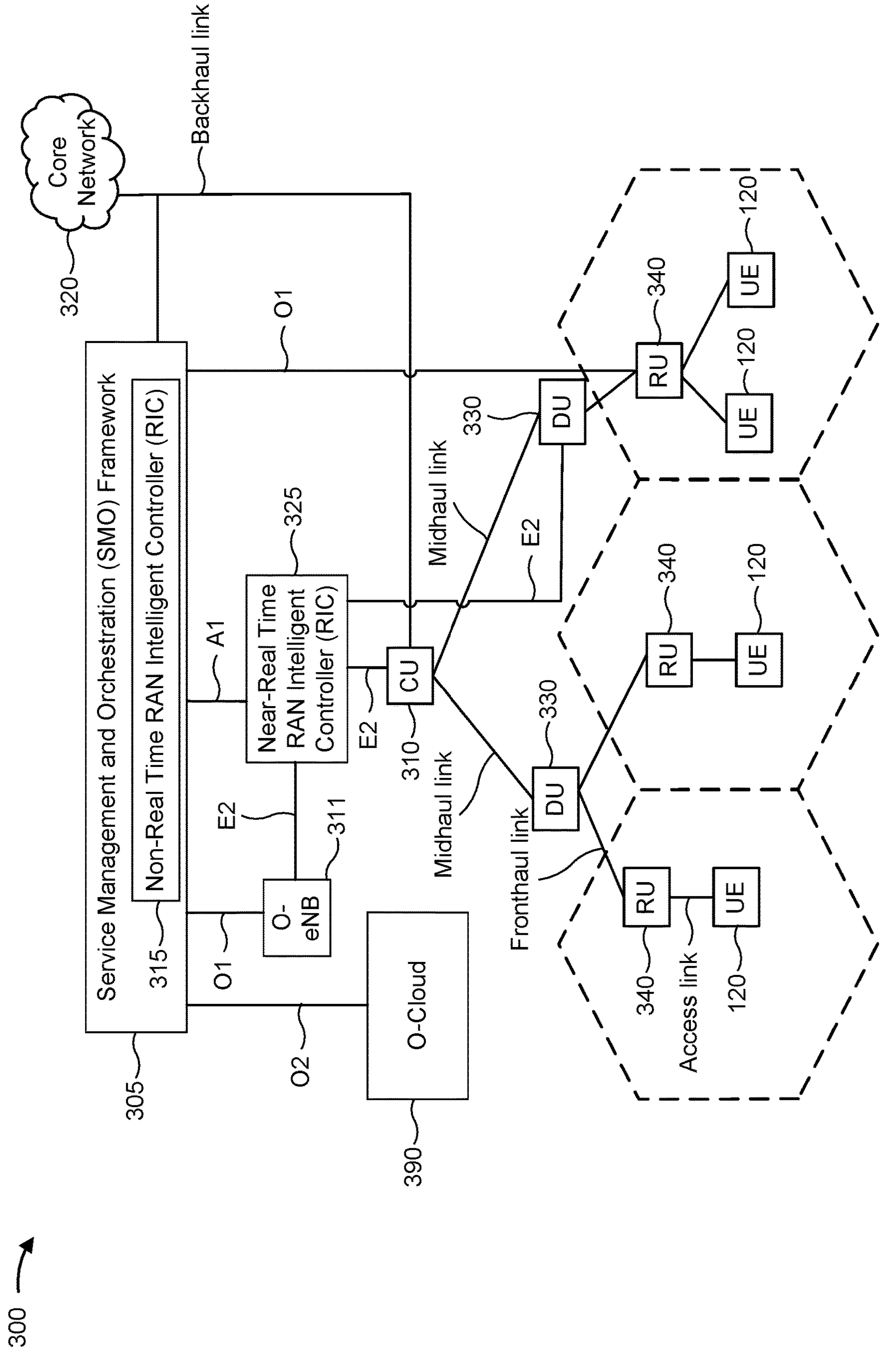
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based at least in part on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

An NR sidelink carrier aggregation operation may be designed to support various features, such as sidelink carrier (re-)selection, synchronization of aggregated carriers, handling of limited capabilities, power control for simultaneous sidelink transmissions, and/or packet duplication. The NR sidelink carrier aggregation operation may support the various features based at least in part on an LTE sidelink carrier aggregation operation. The NR sidelink carrier aggregation operation may be limited to an FR1 licensed spectrum, and an intelligent transportation system (ITS) band within the FR1 licensed spectrum. The NR sidelink carrier aggregation operation may be backward-compatible, such that a Release 16/17 UE may be able to receive Release 18 sidelink broadcast/groupcast transmissions with carrier aggregation for a carrier on which the Release16/17 UE receives a physical sidelink control channel (PSCCH) or physical sidelink shared channel (PSSCH) and transmits corresponding sidelink HARQ feedback, when sidelink HARQ is enabled in sidelink control information (SCI).

Carrier aggregation on a PC5 interface may be implemented to LTE V2X. One independent HARQ entity per carrier may be used for V2X sidelink communication. Each transport block and corresponding potential HARQ retransmissions may be mapped to a single carrier. Multiple transport blocks may be transmitted in parallel on different carriers for a throughput gain. Sidelink carrier aggregation in resource allocation mode 3 using a dynamic grant may include a carrier indication field (CIF) in downlink control information (DCI) from a network node. Sidelink carrier aggregation in resource allocation mode 4 may use a sensing procedure to select resources independently on each involved carrier. The same carrier may be used for all transport blocks of the same sidelink process at least until the process triggers a resource re-selection.

Figure 4:
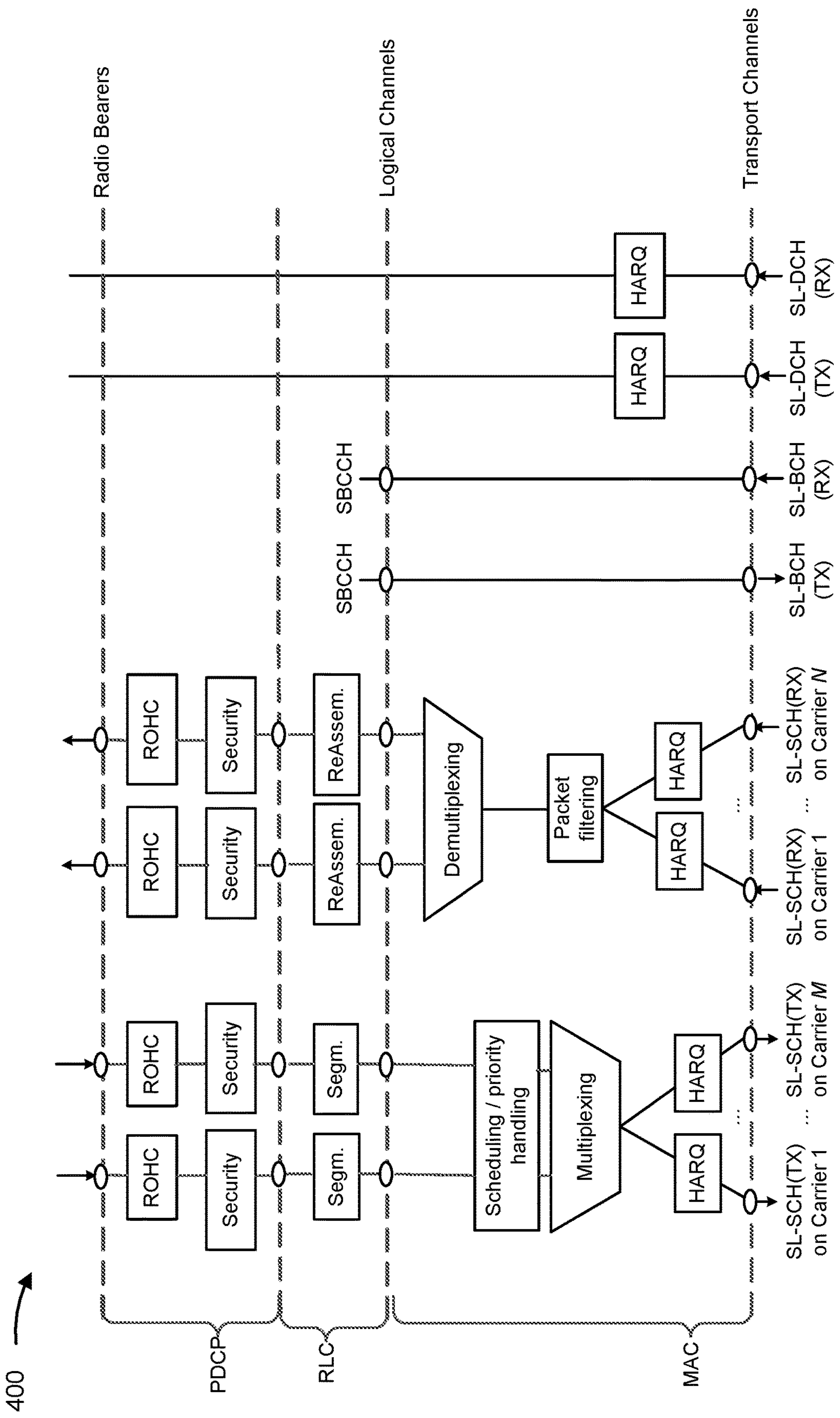
FIG. 4 is a diagram illustrating an example of sidelink carrier aggregation, in accordance with the present disclosure.

FIG. 4 is a diagram illustrating an example 400 of sidelink carrier aggregation, in accordance with the present disclosure.

As shown in FIG. 4, a sidelink shared channel (SL-SCH) for transmissions (Tx) may be associated with a plurality of carriers (e.g., carrier 1 to carrier M). A MAC layer may be associated with HARQ processing, multiplexing, and scheduling and priority handling. An RLC layer may be associated with segmentation. A PDCP layer may be associated with security and robust header compression (ROHC). An SL-SCH for receptions (Rx) may be associated with a plurality of carriers (e.g., carrier 1 to carrier N). The MAC layer may be associated with HARQ processing, packet filtering, and demultiplexing. The RLC layer may be associated with reassembly. The PDCP layer may be associated with security and ROHC. A sidelink broadcast channel (SL-BCH or SBCCH) for Tx and Rx may be defined. A sidelink discovery channel (SL-DCH) for Tx and Rx may be associated with HARQ processing. Further, implementing the sidelink carrier aggregation may involve establishing radio bearers, logical channels, and transport channels.

As indicated above, FIG. 4 is provided as an example. Other examples may differ from what is described with regard to FIG. 4.

Configuration parameters for V2X communication over NR PC5 may be based at least in part on mapping rules. The mapping rules may involve a mapping between one or more V2X service identifiers and an L2 destination ID for a broadcast or groupcast. The mapping rules may involve a mapping between one or more V2X service identifiers and V2X NR frequencies with associated geographical areas. Therefore, an L2 destination ID for a groupcast or broadcast may be associated with multiple V2X services, which may be mapped with different frequency carriers in a geographical area. For example, some services associated to an L2 destination ID may support legacy V2X UEs (e.g., Release 16/17 UEs) which do not support sidelink carrier aggregation, and other services associated to the L2 destination ID may support new V2X UEs (e.g., Release 18 or beyond UEs) which support sidelink carrier aggregation.

For a groupcast or broadcast associated to an L2 destination ID, a packet transmitted on a carrier selected for or by a UE supporting sidelink carrier aggregation may not be received by UEs not supporting sidelink carrier aggregation when the selected carrier is not the carrier for the UEs not supporting sidelink carrier aggregation. As a result, a backward compatibility issue may arise for sidelink carrier aggregation.

In various aspects of techniques and apparatuses described herein, a first UE (e.g., a Tx UE) may transmit, to a second UE (e.g., an Rx UE) that supports sidelink carrier aggregation, duplicated transmissions of a sidelink transmission on a plurality of component carriers based at least in part on a cast type associated with the sidelink transmission and one or more indications received from an upper layer of the first UE. The duplicated transmissions may be associated with the plurality of component carriers associated with an L2 destination ID of the sidelink transmission. The first UE may receive, from the second UE, HARQ feedback if enabled based at least in part on the duplicated transmissions of the sidelink transmission.

In some aspects, to support backward compatibility, the sidelink transmission may be duplicated on the plurality of component carriers (e.g., all component carriers) associated to the L2 destination ID. The sidelink transmission may be duplicated based at least in part on the cast type (e.g., broadcast or groupcast) and the one or more indications from the upper layer. The one or more indications (e.g., Tx profiles) from the upper layer may indicate supporting or not supporting sidelink carrier aggregation for the L2 destination ID of the groupcast or broadcast. The upper layer may indicate, to an access stratum (AS) layer, a plurality of Tx profiles (e.g., all Tx profiles) associated to the L2 destination ID. Alternatively, the upper layer may indicate, to the AS layer, only one Tx profile associated to the L2 destination ID. The sidelink transmission may be duplicated on the plurality of component carriers associated to the L2 destination ID, when at least one indication from the upper layer indicates not supporting sidelink carrier aggregation.

As an example, a Tx profile associated to a V2X or proximity services (ProSe) service identifier may indicate supporting or not supporting sidelink carrier aggregation at an upper layer, and the upper layer may pass all Tx profile(s) associated to an L2 destination ID of a groupcast or broadcast to an AS layer. In this case, an L2 destination ID may be associated with one or multiple Tx profiles from the upper layer, where each Tx profile may indicate supporting or not supporting sidelink carrier aggregation.

As another example, each of one or more Tx profiles associated to one or more V2X or ProSe service identifiers may support or not support sidelink carrier aggregation at an upper layer, and the upper layer may pass down to an AS layer only one Tx profile associated to the L2 destination ID of a groupcast or broadcast based at least in part on whether all Tx profiles support sidelink carrier aggregation or not (e.g., a Tx profile passed down to the AS layer indicating supporting sidelink carrier aggregation when all Tx Profiles at the upper layer support sidelink carrier aggregation, or a Tx profile passed down to the AS layer indicating not supporting sidelink carrier aggregation when one or more Tx Profiles at the upper layer do not support sidelink carrier aggregation). In this case, an L2 destination ID may be associated with one Tx profile from the upper layer, where the Tx profile may indicate supporting or not supporting sidelink carrier aggregation.

In some aspects, the sidelink transmission may be duplicated with MAC protocol data units (PDUs) based at least in part on a configuration that enables duplication with MAC PDUs. A first UE (e.g., a Tx UE) may duplicate a MAC PDU (e.g., a transport block) on the plurality of component carriers associated to the L2 destination ID, based at least in part on the cast type and an indication (e.g., the Tx profile) from the upper layer, and the first UE may insert a duplication indication in a MAC header or subheader. A second UE (e.g., an Rx UE) may remove duplicated MAC PDUs based at least in part on the duplication indication.

In some aspects, the sidelink transmission may be duplicated at a PDCP layer based at least in part on a configuration that enables duplication at the PDCP layer. A first UE (e.g., a Tx UE) may duplicate a PDCP packet on the plurality of component carriers associated to the L2 destination ID, based at least in part on the cast type and an indication (e.g., the Tx profile) from the upper layer, and the first UE may insert a duplication indication in a PDCP header. A second UE (e.g., an Rx UE) may remove duplicated PDCP packets based at least in part on the duplication indication.

Figure 5:
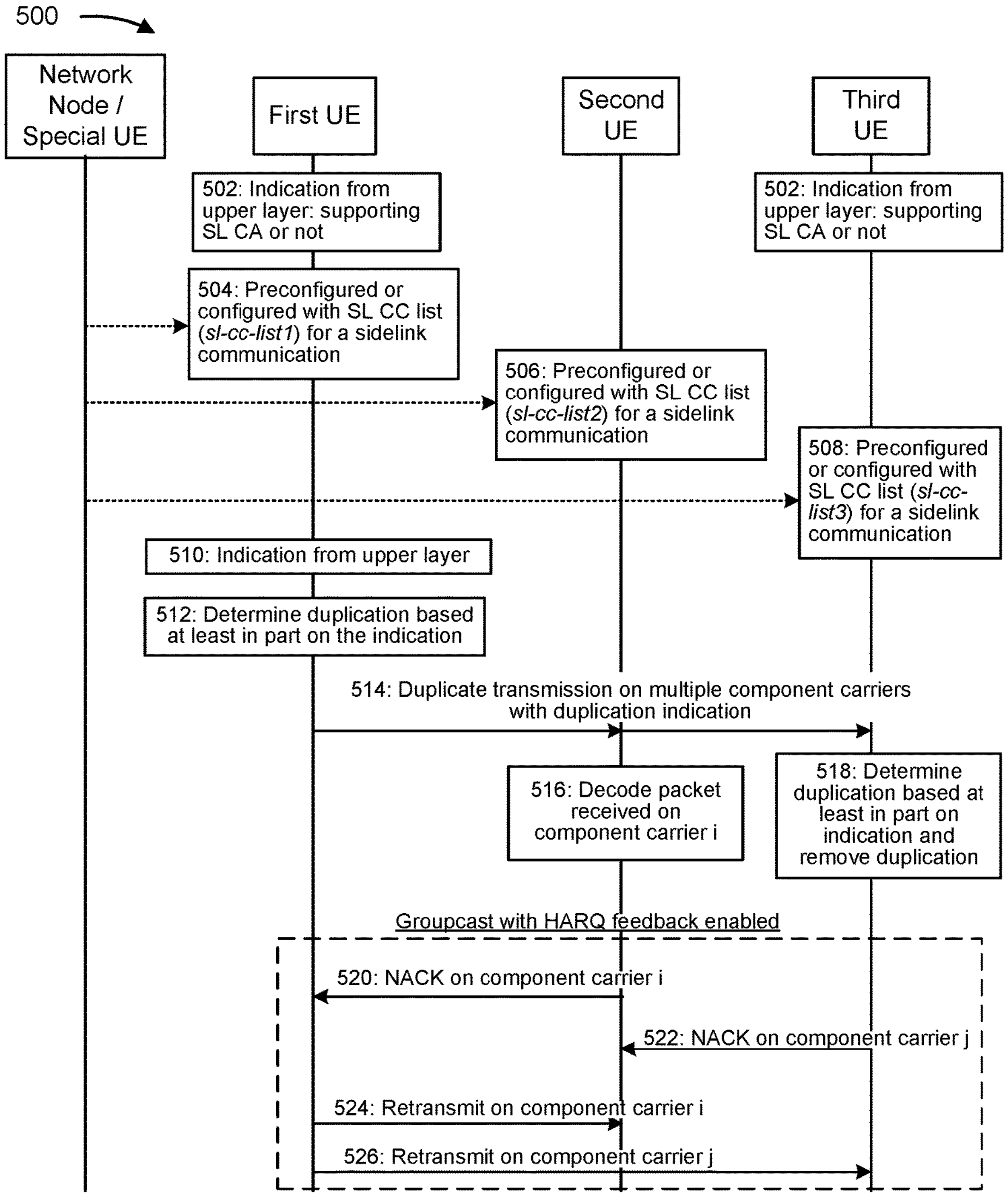
FIGS. 5-7 are diagrams illustrating examples associated with duplicating sidelink transmissions for sidelink carrier aggregation, in accordance with the present disclosure.

FIG. 5 is a diagram illustrating an example 500 associated with duplicating sidelink transmissions for sidelink carrier aggregation, in accordance with the present disclosure. As shown in FIG. 5, communication may occur between a network node (e.g., network node 110) or another UE such as a special UE (e.g., a roadside unit (RSU), a group lead, a cluster head, a scheduling UE, or a Tx UE), a first UE (e.g., UE 120*a*), a second UE, and a third UE (e.g., UE 120*e*). In some aspects, the network node, the special UE, the first UE, the second UE, and the third UE may be included in a wireless network, such as wireless network 100.

In some aspects, the first UE may be a Tx UE supporting sidelink carrier aggregation, the second UE may be a first Rx UE that does not support sidelink carrier aggregation, and the third UE may be a second Rx UE that supports sidelink carrier aggregation.

As shown by reference number 502, the first UE and/or the third UE may receive one or more indication from an upper layer indicating supporting or not supporting sidelink carrier aggregation (e.g., "SL-CA" or "No-SL-CA") based at least in part on the services or service types (supporting or not supporting sidelink carrier aggregation) associated to an L2 destination ID for a groupcast or broadcast. In some aspects, for the indication with not supporting sidelink carrier aggregation (e.g., indicating "No-SL-CA"), one or more carriers may be indicated based at least in part on the mapping between a supported carrier and a service or service type not supporting sidelink carrier aggregation. In some aspects, for the indication with supporting sidelink carrier aggregation (e.g., indicating "SL-CA"), multiple carriers may be indicated based at least in part on the mapping between the supported component carriers and services or service types supporting sidelink carrier aggregation.

As shown by reference number 504, the first UE may be preconfigured or configured, by the network node or the special UE, with a list of sidelink component carriers for a sidelink transmission associated to an L2 destination ID (e.g., for a groupcast or a broadcast). The first UE may be preconfigured or configured with a sidelink component carrier list (e.g., sl-cc-list1) for the sidelink transmission. The first UE may receive, from the network node (e.g., via an RRC configuration) or the special UE (e.g., via a PC5 RRC configuration), a configuration that configures the list of sidelink component carriers for the sidelink transmission associated with the L2 destination ID.

As shown by reference number 506, the second UE may be preconfigured or configured, by the network node or the special UE, with a list of sidelink component carriers for the sidelink transmission associated to the L2 destination ID (e.g., for the groupcast or the broadcast). The second UE may be preconfigured or configured with a sidelink component carrier list (e.g., sl-cc-list2) for the sidelink transmission without supporting sidelink carrier aggregation.

As shown by reference number 508, the third UE may be preconfigured or configured, by the network node or the special UE, with a list of sidelink component carriers for the sidelink transmission associated to the L2 destination ID (e.g., for the groupcast or the broadcast). The third UE may be preconfigured or configured with a sidelink component carrier list (e.g., sl-cc-list3) for the sidelink transmission supporting sidelink carrier aggregation.

As shown by reference number 510, the first UE may receive, from an upper layer of the first UE, one or more indications for the sidelink transmission associated to the L2 destination ID (e.g., for the groupcast or the broadcast). The one or more indications from the upper layer may indicate supporting or not supporting sidelink carrier aggregation for the L2 destination ID of the sidelink transmission (e.g., the groupcast or the broadcast). An indication of the one or more indications may be based at least in part on the mapping with the sidelink services or service types (e.g., supporting or not supporting sidelink carrier aggregation) associated to an L2 destination ID. For example, an indication of the one or more indications may correspond to a Tx profile, where the Tx profile may be based at least in part on the mapping with a service or service type (e.g., a V2X or ProSe service identifier or service type) associated to an L2 destination ID.

As shown by reference number 512, the first UE may determine to duplicate the sidelink transmission on a plurality of component carriers (e.g., multiple or all component carriers of sl-cc-list1) based at least in part on the one or more indications received from the upper layer. For example, the plurality of component carriers may be derived (e.g., based at least in part on one or more sidelink component carriers mapped with one or more sidelink services or service types associated to an L2 destination ID and indicated from the upper layer) from the list of sidelink component carriers (e.g., sl-cc-list1) as received from the network node or the special UE. As another example, the plurality of component carriers may be indicated from the network node or the special UE (e.g., sl-cc-duplicate-list1 in addition to or as a subset of sl-cc-list1). The first UE may determine a transmission duplication on the plurality of component carriers based at least in part on the one or more indications received from the upper layer. The first UE may determine to duplicate the sidelink transmission based at least in part on at least one indication from the upper layer indicating not supporting sidelink carrier aggregation.

As shown by reference number 514, the first UE may transmit duplicated transmissions of the sidelink transmission on the plurality of component carriers. The duplicated transmissions may be associated with the plurality of component carriers, where the plurality of component carriers may be associated with the L2 destination ID of the sidelink transmission. The first UE may transmit the duplicated transmissions of the sidelink transmission based at least in part on a cast type (e.g., broadcast or groupcast) associated with the sidelink transmission, and based at least in part on the one or more indications received from the upper layer. In some aspects, the first UE may transmit the duplicated transmissions of the sidelink transmission with a duplication indication. The first UE may insert the duplication indication into the duplicated transmissions of the sidelink transmission, where the duplication indication may indicate a presence of the duplicated transmissions.

In some aspects, the duplicated transmissions of the sidelink transmission may be based at least in part on duplicated MAC PDUs. The duplicated MAC PDUs may be associated with the plurality of component carriers, which may be associated to the L2 destination ID. The duplication indication associated to the duplicated transmissions may be included in a MAC header or subheader of the duplicated transmissions. In some aspects, the duplicated transmissions of the sidelink transmission may be based at least in part on duplicated PDCP packets. The duplicated PDCP packets may be for a plurality of logical channels mapped with the plurality of component carriers associated to the L2 destination ID. The duplication indication associated with the duplicated transmissions may be included in a PDCP header of the duplicated transmissions.

As shown by reference number 516, the second UE may monitor the sidelink transmission on sidelink component carriers (e.g., sl-cc-list2 containing component carrier i) associated with the second UE. The second UE may not support sidelink carrier aggregation and may receive the sidelink transmission on a component carrier (e.g., component carrier i). The second UE may decode a packet received on the component carrier.

As shown by reference number 518, the third UE may monitor the sidelink transmission on sidelink component carriers (e.g., sl-cc-list3 containing component carrier 0 to component carrier m) associated with the third UE. The third UE may support sidelink aggregation and may receive, from the first UE, the duplicated transmissions of the sidelink transmission on the plurality of component carriers (e.g., component carrier 0 to component carrier m) based at least in part on the cast type associated with the sidelink transmission, the one or more indications received from the upper layer of the first UE, and/or a support of sidelink carrier aggregation by the third UE. The third UE may determine that received sidelink transmissions are duplicated transmissions based at least in part on the duplication indication. The third UE may remove the duplicated transmissions of the sidelink transmission based at least in part on the duplication indication, and the third UE may obtain the sidelink transmission (e.g., a single sidelink transmission).

As shown by reference number 520, the second UE may transmit a negative acknowledgement (NACK) on the component carrier (e.g., component carrier i) when the second UE fails to decode the sidelink transmission (e.g., the packet received from the first UE).

As shown by reference number 522, the third UE may transmit a NACK on a component carrier (e.g., component carrier j among component carrier 0 to component carrier m) when the third UE fails to decode all of the duplicated transmissions of the sidelink transmission (e.g., all duplications of the packet) received from the first UE. The third UE may determine the component carrier for HARQ feedback and transmit the NACK using the component carrier accordingly. The first UE may receive, from the third UE, HARQ feedback that indicates the NACK, where the HARQ feedback if enabled may be based at least in part on the duplicated transmissions of the sidelink transmission.

As shown by reference number 524, the first UE may retransmit, to the second UE, the duplicated transmissions of the sidelink transmission on the component carrier (e.g., component carrier i) associated with the component carrier on which the NACK is received from the second UE.

As shown by reference number 526, the first UE may retransmit, to the third UE, the duplicated transmissions of the sidelink transmission on the component carrier (e.g., component carrier j) associated with the component carrier on which the NACK is received from the third UE. The first UE may retransmit the sidelink transmission on the component carrier, of the plurality of component carriers, based at least in part on the HARQ feedback.

In some aspects, the second UE and the third UE may transmit NACKs to the first UE, and the first UE may retransmit the duplicated transmissions of the sidelink transmission based at least in part on a groupcast with HARQ feedback enabled.

As indicated above, FIG. 5 is provided as an example. Other examples may differ from what is described with regard to FIG. 5.

Figure 6:
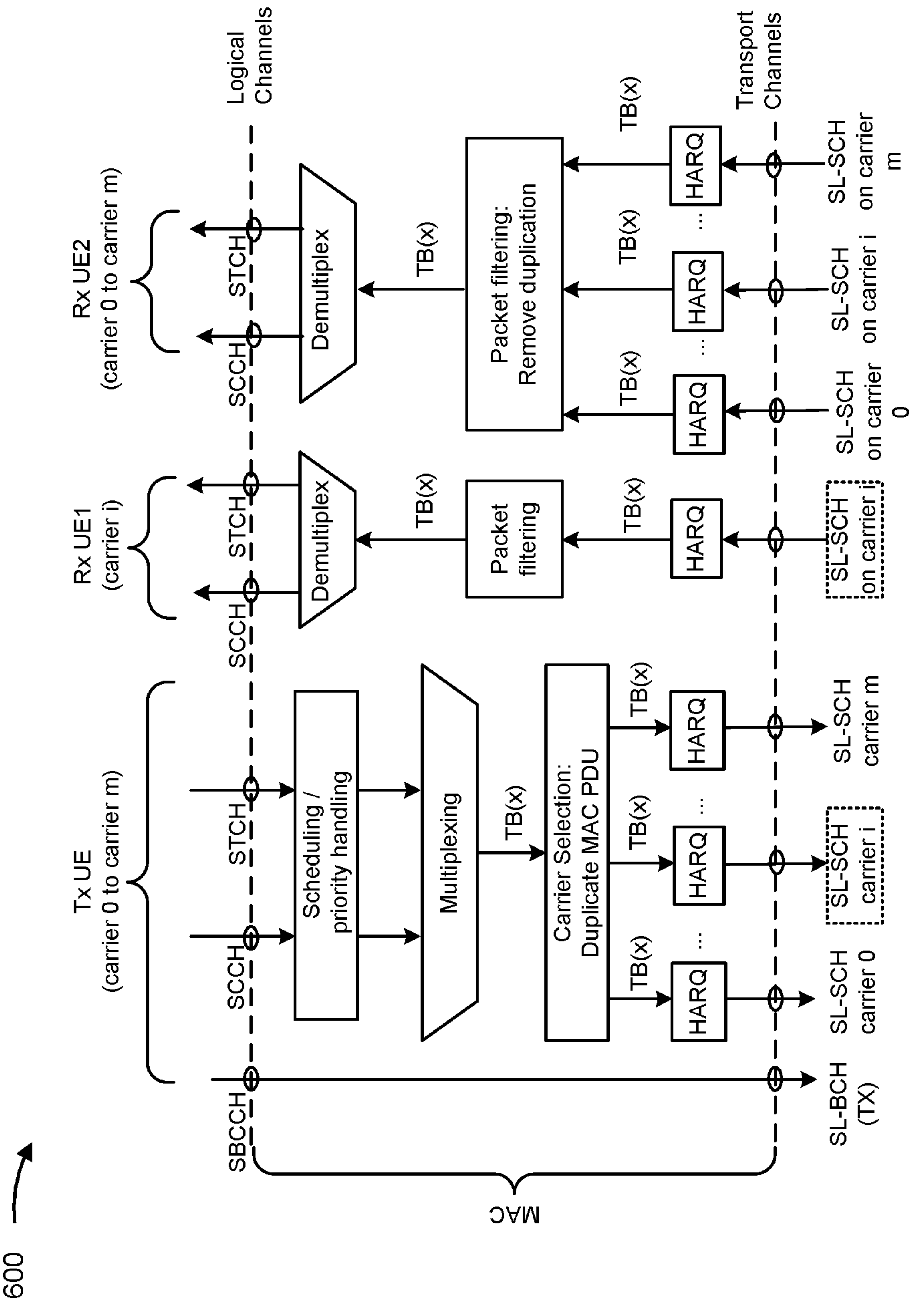

FIG. 6 is a diagram illustrating an example 600 associated with duplicating sidelink transmissions for sidelink carrier aggregation, in accordance with the present disclosure.

In some aspects, a sidelink transmission may be duplicated with MAC PDUs on a plurality of carriers (e.g., some or all carriers) associated to an L2 destination ID of a groupcast or broadcast, when at least one indication from an upper layer indicates not supporting sidelink carrier aggregation. A first UE (e.g., a Tx UE) supporting sidelink carrier aggregation may select a plurality of carriers (e.g., some or all of carrier 0 to carrier m) associated to the L2 destination ID of the groupcast or the broadcast, and duplicate a transport block (e.g., TB(x)) on the plurality of carriers. The first UE may insert a duplication indication in a MAC header or subheader (e.g., MACduplicate=1). The duplicated transport block on the plurality of carriers may correspond to a duplicated sidelink transmission. A second UE (e.g., a first Rx UE) not supporting sidelink carrier aggregation may receive the transport block (e.g., TB(x)) on a carrier (e.g., carrier i) associated with the second UE. A third UE (e.g., a second Rx UE) supporting sidelink carrier aggregation may receive the transport block (e.g., TB(x)) on the plurality of carriers (e.g., carrier 0 to carrier m), and the third UE may determine to perform a duplication removal based at least in part on the duplication indication (e.g., MACduplicate=1).

As shown in FIG. 6, at the first UE (e.g., the Tx UE, which may be associated with carrier 0 to carrier m), a MAC layer may involve a scheduling and priority handling, multiplexing, carrier selection, and HARQ processing. The multiplexing may result in a transport block (e.g., TB(x)), which may be duplicated with MAC PDUs or sub-PDUs, which may result in duplicated transport blocks (e.g., duplicated TB(x) with HARQ entities associated with the plurality of carriers (e.g., some or all of carrier 0 to carrier m) for duplication. For example, the duplicated transport blocks may include a first transport block associated with a sidelink shared channel (SL-SCH) on carrier 0, a second transport block associated with an SL-SCH on carrier i, and a third transport block associated with an SL-SCH on carrier m. The second UE (e.g., the first Rx UE, which may be associated with carrier i) not supporting sidelink carrier aggregation may receive the transport block on a single carrier (e.g., carrier i) associated with the second UE. The third UE (e.g., the second Rx UE, which may be associated with carrier 0 to carrier m) supporting sidelink carrier aggregation may receive the transport blocks on a plurality of carriers (e.g., some or all of carrier 0 to carrier m). The third UE may determine to remove duplicated transport blocks based at least in part on a duplication indication inserted in a MAC header of the duplicated transport blocks, thereby resulting in a single transport block for which a demultiplexing is applied.

In some aspects, the third UE may determine transmission duplication based at least in part on the duplication indication in a MAC header or subheader, the logical channel identifier (LCD), and the pair of source and destination identifiers of the duplicated MAC PDUs or MAC sub-PDUs received from a plurality of carriers. A MAC entity may receive from a first component carrier a first MAC PDU or sub-PDU containing a duplication indication in the MAC header or subheader and a first logical channel ID and first pair of source and destination IDs, and may receive from a second component carrier a second MAC PDU or sub-PDU containing a duplication indication in the MAC header or subheader and a second logical channel ID and second pair of source and destination IDs). For example, if the MAC entity successfully decodes the first MAC PDU or sub-PDU and if the first logical channel ID is the same as the second logical ID (e.g., the same logical channel instance) and if the first pair of source and destination IDs is the same as the second pair of source and destination IDs (e.g., transmitted from the same UE (source ID) for the same sidelink communication (destination ID)), the MAC entity may deliver the MAC service data unit (SDU) extracted from the first MAC PDU or sub-PDU to an upper layer (e.g., RLC layer) and discard the second MAC PDU or sub-PDU (e.g., the HARQ entity associated to the second MAC PDU or sub-PDU on the second component carrier may flush the buffer) and transmit an ACK on the first component carrier or may not transmit any NACK on the first component carrier and/or the second component carrier. For example, if the MAC entity decodes unsuccessfully the first MAC PDU or sub-PDU and decodes successfully the second MAC PDU or sub-PDU and if the first logical channel ID is the same as the second logical ID and if the first pair of source and destination IDs is the same as the second pair of source and destination IDs for the same sidelink communication (destination ID)), the MAC entity may deliver the MAC SDU extracted from the second MAC PDU or sub-PDU to upper layer (e.g., RLC layer) and discard the first MAC PDU or sub-PDU (e.g., the HARQ entity associated to the first MAC PDU or sub-PDU on the first component carrier may flush the buffer) and transmit an ACK on the second component carrier or may not transmit any NACK on the first component carrier and/or the second component carrier (e.g., if HARQ feedback is enabled). As another example, if the MAC entity decodes unsuccessfully both the first MAC PDU or sub-PDU and the second MAC PDU or sub-PDU and if the first logical channel ID is the same as the second logical ID and if the first pair of source and destination IDs is the same as the second pair of source and destination IDs for the same sidelink communication (destination ID)), the MAC entity may transmit a NACK on either the first or the second component carrier (e.g., if HARQ feedback is enabled), where the first or the second component carrier may be randomly selected or may be selected based at least in part on the measurements associated with the first and second MAC PDU or sub-PDU (e.g., based at least in part on the RSRP or SINK measurement of the PSSCH carrying the first or second MAC PDU or sub-PDU).

In some aspects, the first UE may determine the retransmissions (e.g., if HARQ feedback is enabled) on one or more component carriers based at least in part on the ACK or no NACK received. For example, the MAC entity may determine no retransmission (e.g., the HARQ entities associated to the duplicated transmissions on multiple component carriers may flash the buffer and indicate a success (e.g., an ACK) to upper layer if needed) on any component carrier if one or more ACK received from all RX UEs (e.g., each Rx UE of a group responds with an ACK/NACK for HARQ feedback) or no NACK received (e.g., an Rx UE responds only NACK for HARQ feedback) for the duplicated transmissions. For example, the MAC entity may determine one or more retransmissions via the HARQ entities associated with the component carriers with one or more NACKs received while the other HARQ entities associated with the component carriers with one or more ACKs or no NACKs received may flush the buffer with the duplicated TBs). The MAC entity may indicate a success (e.g., an ACK) to upper layer (e.g., RLC layer) after one or more ACK or no NACK received on the component carriers for all retransmissions or may indicate a failure (e.g., a NACK) to upper layer after being timed out or reaching the maximum retransmissions allowed (e.g., as configured) for the retransmission on any component carrier corresponding to duplicated transmissions.

As indicated above, FIG. 6 is provided as an example. Other examples may differ from what is described with regard to FIG. 6.

Figure 7:
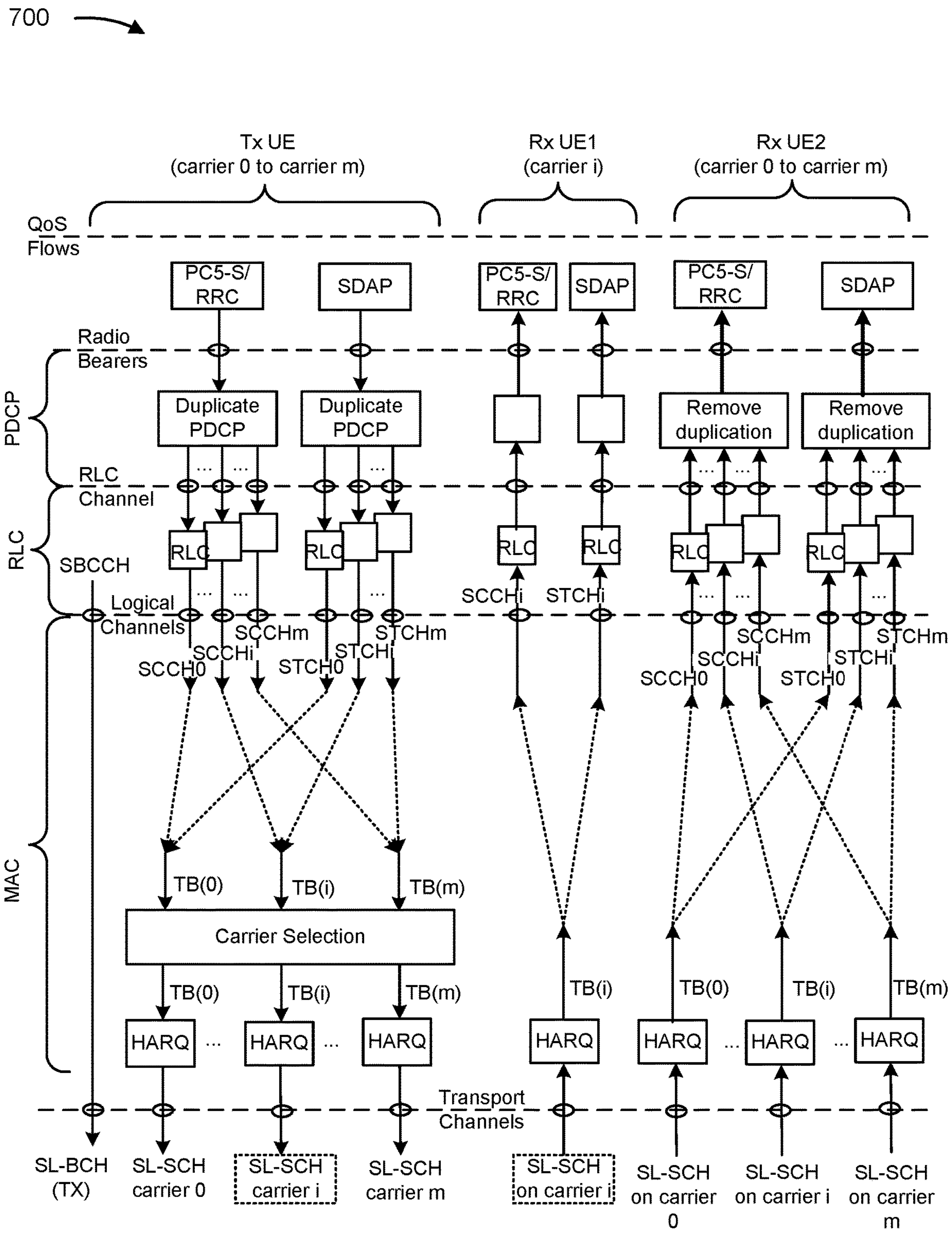

FIG. 7 is a diagram illustrating an example 700 associated with duplicating sidelink transmissions for sidelink carrier aggregation, in accordance with the present disclosure.

In some aspects, a sidelink transmission may be duplicated at a PDCP layer via duplicated RLC entities with duplicated logical channels mapped to a plurality of carriers (e.g., some or all of carrier 0 to carrier m), based at least in part on a cast type and at least one indication from an upper layer indicating not supporting sidelink carrier aggregation. A first UE (e.g., a Tx UE) supporting sidelink carrier aggregation may duplicate a PDCP packet on duplicated logical channels mapped with some or all carriers (e.g., sidelink control channel (SCCH) 0 to SCCH m, or sidelink traffic channel (STCH) 0 to STCH m), and the first UE may insert a duplication indication in a PDCP header (e.g., PDCPduplicate=1 or PDCP sequence number (SN) without "0" value). The duplicated PDCP packet on duplicated logical channels mapped with the plurality of carriers may correspond to a duplicated sidelink transmission. A second UE (e.g., a first Rx UE) not supporting sidelink carrier aggregation may receive the PDCP packet on a logical channel mapped with its carrier (e.g., carrier i). A third UE (e.g., a second Rx UE) supporting sidelink carrier aggregation may receive PDCP packets on duplicated logical channels mapped with the plurality of carriers (e.g., some or all of carrier 0 to carrier m), and the third UE may determine to perform a duplication removal based at least in part on the duplication indication (e.g., PDCPduplicate=1 or PDCP SN).

As shown in FIG. 7, at the first UE (e.g., the Tx UE, which may be associated with carrier 0 to carrier m), the PDCP layer may duplicate a PDCP packet. The PDCP packet duplication may be based at least in part on a quality of service (QoS) flow, which may be associated with a PC5 sidelink (PC5-S) or RRC layer or a service data adaptation protocol (SDAP) layer. Duplicated PDCP packets may further undergo a scheduling or priority handling, multiplexing, carrier selection, and HARQ processing. The duplicated PDCP packets may result in duplicated transport blocks (e.g., TB (0), . . . , TB(i), TB(m) as shown), which may correspond to a plurality of carriers (e.g., some or all of carrier 0 to carrier m). The second UE (e.g., the first Rx UE, which may be associated with carrier i) not supporting sidelink carrier aggregation may receive a PDCP packet on a logical channel mapped to a single carrier (e.g., carrier i) associated with the second UE, where the PDCP packet may be derived from a received transport block (e.g., TB(i)). The third UE (e.g., the second Rx UE, which may be associated with carrier 0 to carrier m) supporting sidelink carrier aggregation may receive PDCP packets on duplicated logical channels mapped with the plurality of carriers (e.g., some or all of carrier 0 to carrier m), where the PDCP packets may be derived from received transport blocks (e.g., TB (0) to TB(m)). The received transport blocks may be subjected to a HARQ processing, a packet filtering, and a demultiplexing before the PDCP packets are obtained. The third UE may determine to remove duplicated PDCP packets based at least in part on a duplication indication inserted in a PDCP header of the duplicated PDCP packets (e.g., PDCPduplicate=1 or PDCP SN), thereby resulting in a single PDCP packet.

In some aspects, the third UE may determine transmission duplication based at least in part on the duplication indication in a PDCP header of the duplicated PDCP PDU. A PDCP entity may receive a first PDCP PDU from a first duplicated logical channel via a first duplicated RLC entity and may receive a second PDCP PDU from a second duplicated logical channel via a second duplicated RLC entity. For example, if the PDCP entity successfully received the first PDCP PDU with the indication of duplication, the PDCP entity may deliver the PDCP SDU extracted from the first PDCP PDU to upper layer (e.g., PC5-S or RRC for control plane or SDAP for user plane), discard the second PDCP PDU, and, for an acknowledged mode (AM) data radio bearer (DRB), transmit a PDCP status report to the first UE setting in the bitmap field as '1' for the first PDCP SDU. For example, if the PDCP entity unsuccessfully received the first PDCP PDU and received successfully the second PDCP PDU, the PDCP entity may deliver the PDCP SDU extracted from the second PDCP PDU to an upper layer, discard the first PDCP PDU, and, for an AM DRB, transmit a PDCP status report to the first UE setting in the bitmap field as '1' for the second PDCP SDU. As another example, if the PDCP entity unsuccessfully received both the first PDCP PDU and the second PDCP PDU, the PDCP entity may not deliver any PDCP SDU to an upper layer and, for an AM DRB, may transmit a PDCP status report to the first UE setting in the bitmap field as '0' respectively for the first and second PDCP SDU.

In some aspects, for AM DRBs configured by an upper layer, the first UE may determine the retransmissions on one or more component carriers based at least in part on the PDCP status report(s) received. For example, the PDCP entity may determine the duplication for a retransmission based at least in part on PDCP status reports received from Rx UEs, wherein each PDCP status report contains bitmap "0" or "1" for a PDCP SDU corresponding to duplicated transmissions. For example, the PDCP entity may determine a duplication for retransmissions on a first duplicated logical channel and a second duplicated logical channel corresponding to a first component carrier and a second component carrier (e.g., logical channel i and logical channel j mapped to component carrier i and component carrier j respectively) if bitmap "0" for a first PDCP SDU associated to the first duplicated logical channel mapped to the first component carrier and bitmap "0" for a second PDCP SDU associated to the second duplicated logical channel mapped to the second component carrier (e.g., logical channel i and logical channel j mapped to component carrier i and component carrier j respectively).

As indicated above, FIG. 7 is provided as an example. Other examples may differ from what is described with regard to FIG. 7.

In some aspects, the indication from the upper layer may indicate supporting or not supporting sidelink carrier aggregation. For example, if one or more indications all indicating supporting sidelink carrier aggregation (e.g., indicating "SL-CA"), no transmission duplication is applied. The first UE may select any component carrier (e.g., any component carrier of carrier 0 to carrier m) for transmitting a TB and the third UE may monitor all the component carriers (e.g., all carriers on sl-cc-list3) for the TB transmission. For example, if at least one indication indicating not supporting sidelink carrier aggregation (e.g., indicating "No-SL-CA"), the first UE or the third UE may determine transmission duplication on a plurality of carriers (e.g., some or all of carrier to carrier m) for transmitting a TB and the third UE may monitor the plurality of carriers for duplication or all the component carriers for the TB transmission. In some aspects, the plurality of carriers may be determined by the first UE and/or the third UE based at least in part on one or more carriers indicated from upper layer with the indication "No-SL-CA" (e.g., carrier i associated to service i or service type i not supporting sidelink carrier aggregation and carrier j associated to service j or service type j not supporting sidelink carrier aggregation, where carrier i and carrier j are within the sl-cc-list containing carrier 0 to carrier m ($0 \le i, j \le m$)). In some aspects, the plurality of carriers may be determined by the first UE and/or the third UE based at least in part on a sidelink component carrier list for duplication (e.g., sl-cc-duplicate-list) preconfigured or configured based at least in part on the mapping between supported component carriers and services or service types not supporting sidelink carrier aggregation.

Figure 8:
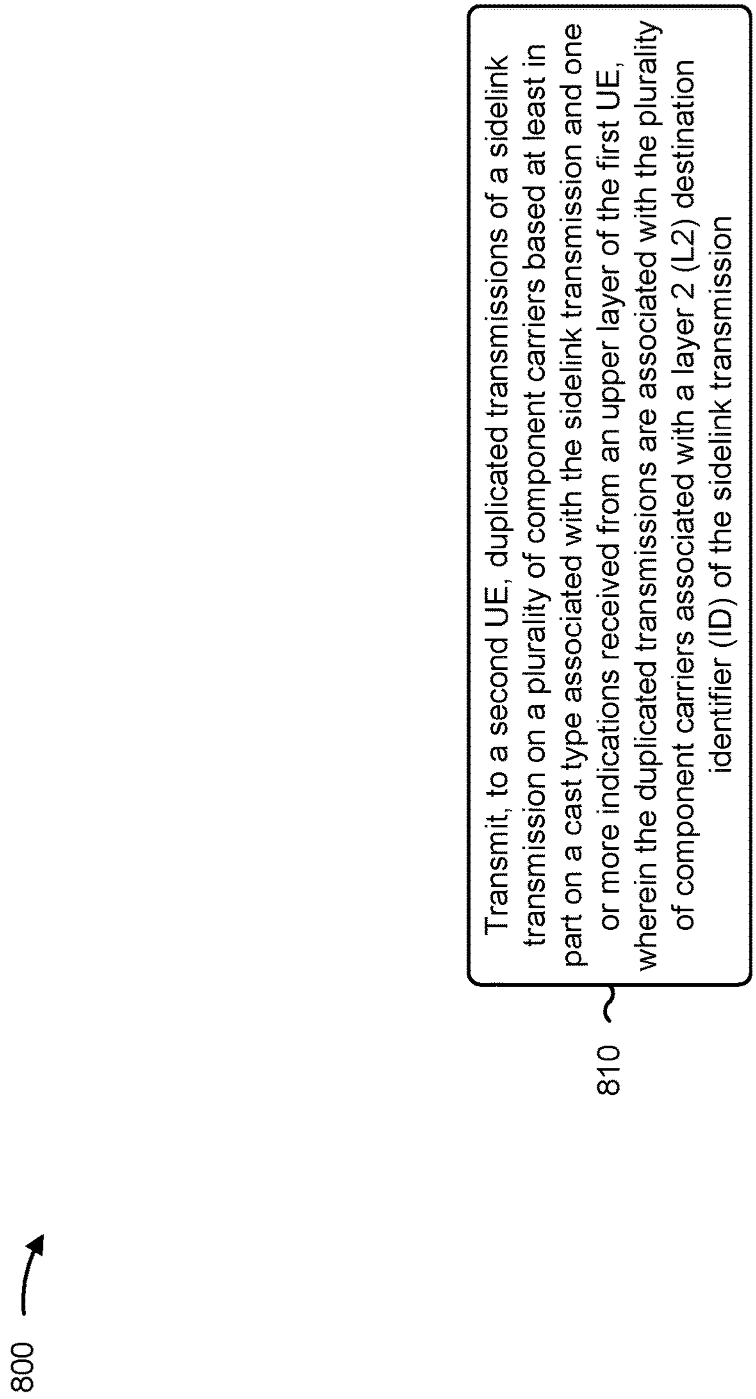
FIGS. 8-9 are diagrams illustrating example processes associated with duplicating sidelink transmissions for sidelink carrier aggregation, in accordance with the present disclosure.

FIG. 8 is a diagram illustrating an example process 800 performed, for example, by a first UE, in accordance with the present disclosure. Example process 800 is an example where the first UE (e.g., UE 120*a*) performs operations associated with duplicating sidelink transmissions for sidelink carrier aggregation.

As shown in FIG. 8, in some aspects, process 800 may include transmitting, to a second UE, duplicated transmissions of a sidelink transmission on a plurality of component carriers based at least in part on a cast type associated with the sidelink transmission and one or more indications received from an upper layer of the first UE, wherein the duplicated transmissions are associated with the plurality of component carriers associated with an L2 destination ID of the sidelink transmission (block 810). For example, the first UE (e.g., using communication manager 140 and/or transmission component 1004, depicted in FIG. 10) may transmit, to a second UE, duplicated transmissions of a sidelink transmission on a plurality of component carriers based at least in part on a cast type associated with the sidelink transmission and one or more indications received from an upper layer of the first UE, wherein the duplicated transmissions are associated with the plurality of component carriers associated with an L2 destination ID of the sidelink transmission, as described above. The second UE may correspond to a third UE, as described in connection with FIGS. 5-7.

Process 800 may include additional aspects, such as any single aspect or any combination of aspects described below and/or in connection with one or more other processes described elsewhere herein.

In a first aspect, the one or more indications from the upper layer indicate supporting or not supporting sidelink carrier aggregation for the L2 destination ID of the sidelink transmission.

In a second aspect, alone or in combination with the first aspect, the cast type is a groupcast or a broadcast, and the L2 destination ID of the sidelink transmission is of the groupcast or the broadcast.

In a third aspect, alone or in combination with one or more of the first and second aspects, process 800 includes receiving, from a network node or a special UE, a configuration that configures a list of sidelink component carriers for the sidelink transmission associated to the L2 destination ID, wherein the plurality of component carriers are derived from the list of sidelink component carriers.

In a fourth aspect, alone or in combination with one or more of the first through third aspects, process 800 includes determining to duplicate the sidelink transmission on the plurality of component carriers based at least in part on at least one indication, of the one or more indications from the upper layer, indicating not supporting sidelink carrier aggregation.

In a fifth aspect, alone or in combination with one or more of the first through fourth aspects, process 800 includes transmitting a duplication indication that indicates a presence of the duplicated transmissions.

In a sixth aspect, alone or in combination with one or more of the first through fifth aspects, the duplicated transmissions of the sidelink transmission are based at least in part on duplicated MAC PDUs, wherein the duplicated MAC PDUs are associated with the plurality of component carriers associated to the L2 destination ID, and a duplication indication associated with the duplicated transmissions is in a MAC header of the duplicated transmissions.

In a seventh aspect, alone or in combination with one or more of the first through sixth aspects, the duplicated transmissions of the sidelink transmission are based at least in part on duplicated PDCP packets, wherein the duplicated PDCP packets are for a plurality of logical channels mapped with the plurality of component carriers associated to the L2 destination ID, and a duplication indication associated with the duplicated transmissions is in a PDCP header of the duplicated transmissions.

In an eighth aspect, alone or in combination with one or more of the first through seventh aspects, process 800 includes receiving, from the second UE, HARQ feedback based at least in part on the duplicated transmissions of the sidelink transmission; and retransmitting, to the second UE, the sidelink transmission on a component carrier, of the plurality of component carriers, based at least in part on the HARQ feedback.

In a ninth aspect, alone or in combination with one or more of the first through eighth aspects, an indication of the one or more indications corresponds to a Tx profile, and the Tx profile is associated with a V2X or ProSe service identifier.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
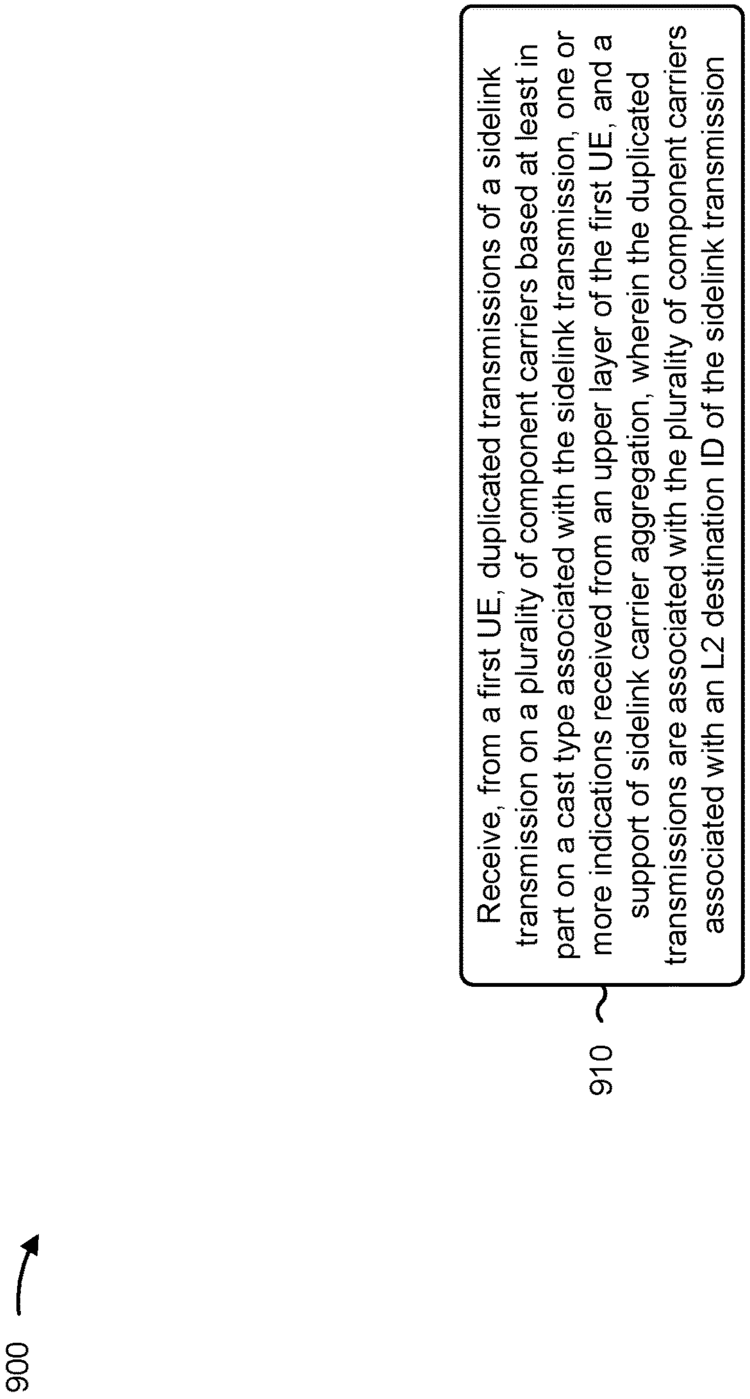

FIG. 9 is a diagram illustrating an example process 900 performed, for example, by a second UE, in accordance with the present disclosure. Example process 900 is an example where the second UE (e.g., UE 120*e*) performs operations associated with duplicating sidelink transmissions for sidelink carrier aggregation. The second UE may correspond to a third UE, as described in connection with FIGS. 5-7.

As shown in FIG. 9, in some aspects, process 900 may include receiving, from a first UE, duplicated transmissions of a sidelink transmission on a plurality of component carriers based at least in part on: a cast type associated with the sidelink transmission, and one or more indications received from an upper layer of the second UE, and the one or more indications support sidelink carrier aggregation, wherein the duplicated transmissions are associated with the plurality of component carriers associated with an L2 destination ID of the sidelink transmission (block 910). For example, the second UE (e.g., using communication manager 150 and/or reception component 1102, depicted in FIG. 11) may receive, from a first UE, duplicated transmissions of a sidelink transmission on a plurality of component carriers based at least in part on: a cast type associated with the sidelink transmission, and one or more indications received from an upper layer of the second UE, and the one or more indications support sidelink carrier aggregation, wherein the duplicated transmissions are associated with the plurality of component carriers associated with an L2 destination ID of the sidelink transmission, as described above.

Process 900 may include additional aspects, such as any single aspect or any combination of aspects described below and/or in connection with one or more other processes described elsewhere herein.

In a first aspect, process 900 includes receiving a duplication indication, with the duplicated transmissions of the sidelink transmission, that indicates a presence of the duplicated transmissions, and removing the duplicated transmissions based at least in part on the duplication indication.

In a second aspect, alone or in combination with the first aspect, the duplicated transmissions of the sidelink transmission are based at least in part on duplicated MAC PDUs, wherein the duplicated MAC PDUs are associated with the plurality of component carriers associated to the L2 destination ID, and a duplication indication associated with the duplicated transmissions is in a MAC header of the duplicated transmissions.

In a third aspect, alone or in combination with one or more of the first and second aspects, the duplicated transmissions of the sidelink transmission are based at least in part on duplicated PDCP packets, wherein the duplicated PDCP packets are for a plurality of logical channels mapped with the plurality of component carriers associated to the L2 destination ID, and a duplication indication associated with the duplicated transmissions is in a PDCP header of the duplicated transmissions.

In a fourth aspect, alone or in combination with one or more of the first through third aspects, process 900 includes transmitting, to the first UE, HARQ feedback based at least in part on the duplicated transmissions of the sidelink transmission; and receiving, from the first UE, a retransmission of the sidelink transmission on a component carrier, of the plurality of component carriers, based at least in part on the HARQ feedback.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
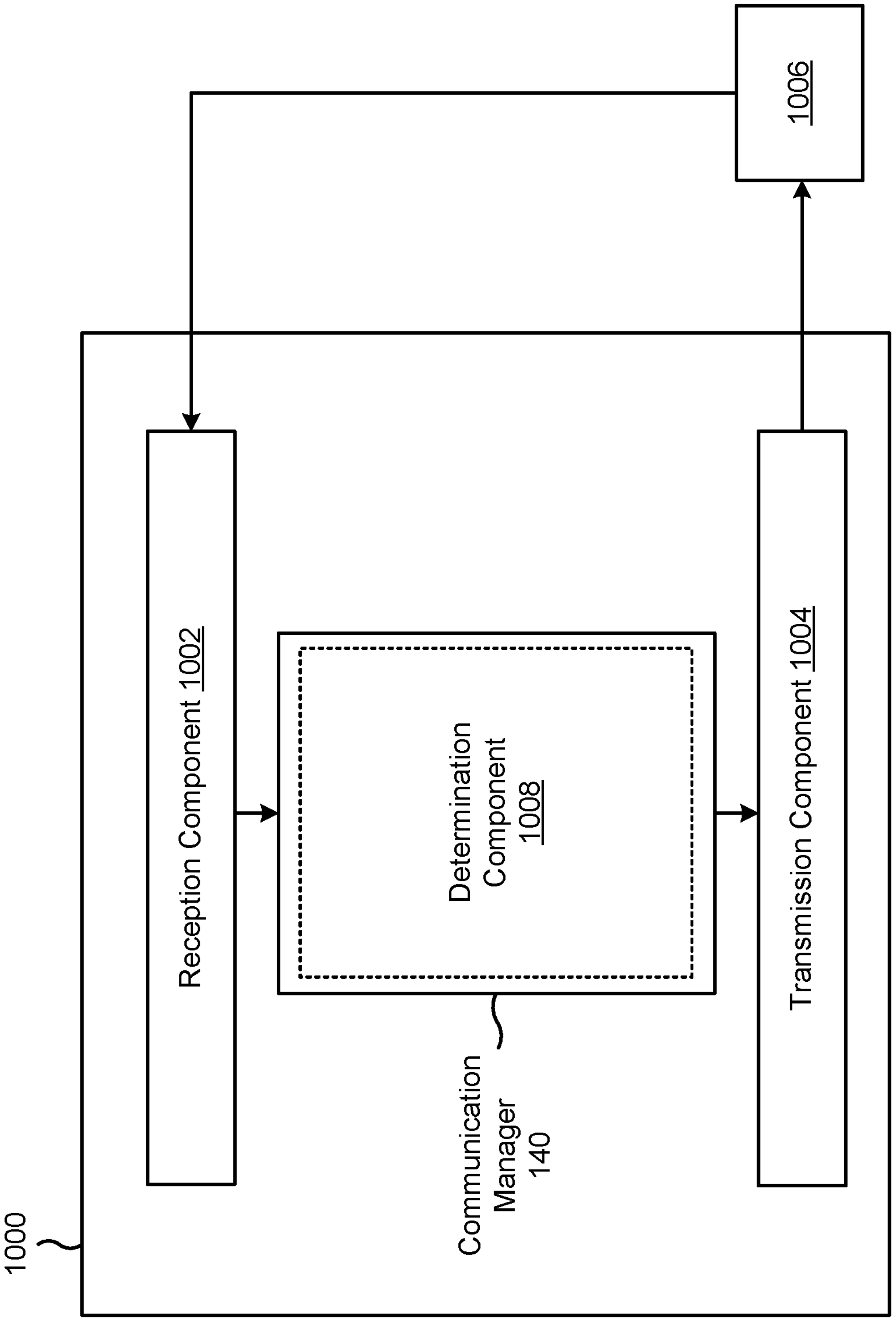
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a first UE, or a first UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a determination component 1008, among other examples.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the first UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first UE described in connection with FIG. 2. In some aspects, the transmission component 1004 may be co-located with the reception component 1002 in a transceiver.

The transmission component 1004 may transmit, to a second UE, duplicated transmissions of a sidelink transmission on a plurality of component carriers based at least in part on a cast type associated with the sidelink transmission and one or more indications received from an upper layer of the first UE, wherein the duplicated transmissions are associated with the plurality of component carriers associated with an L2 destination ID of the sidelink transmission.

The reception component 1002 may receive, from a network node or a special UE, a configuration that configures a list of sidelink component carriers for the sidelink transmission associated to the L2 destination ID, wherein the plurality of component carriers are derived from the list of sidelink component carriers. The determination component 1008 may determine to duplicate the sidelink transmission on the plurality of component carriers based at least in part on at least one indication, of the one or more indications from the upper layer, indicating not supporting sidelink carrier aggregation. The reception component 1002 may receive, from the second UE, HARQ feedback based at least in part on the duplicated transmissions of the sidelink transmission. The transmission component 1004 may retransmit, to the second UE, the sidelink transmission on a component carrier, of the plurality of component carriers, based at least in part on the HARQ feedback.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
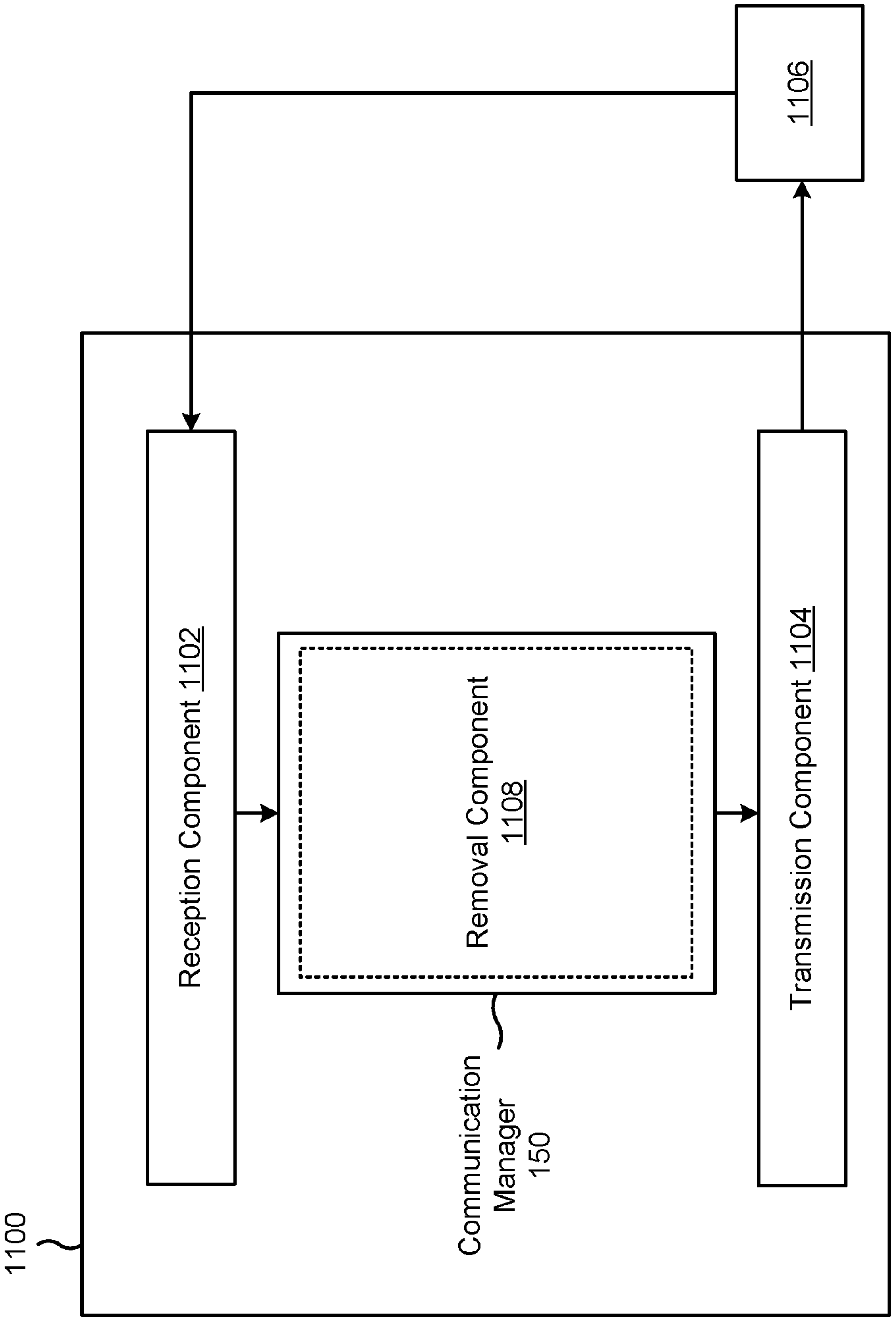

FIG. 11 is a diagram of an example apparatus 1100 for wireless communication, in accordance with the present disclosure. The apparatus 1100 may be a second UE, or a second UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a removal component 1108, among other examples.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the second UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the second UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the second UE described in connection with FIG. 2. In some aspects, the transmission component 1104 may be co-located with the reception component 1102 in a transceiver.

The reception component 1102 may receive, from a first UE, duplicated transmissions of a sidelink transmission on a plurality of component carriers based at least in part on a cast type associated with the sidelink transmission, and one or more indications received from an upper layer of the second UE, and the one or more indications support sidelink carrier aggregation, wherein the duplicated transmissions are associated with the plurality of component carriers associated with an L2 destination ID of the sidelink transmission.

The reception component 1102 may receive a duplication indication, with the duplicated transmissions of the sidelink transmission, that indicates a presence of the duplicated transmissions. The removal component 1108 may remove the duplicated transmissions based at least in part on the duplication indication. The transmission component 1104 may transmit, to the first UE, HARQ feedback based at least in part on the duplicated transmissions of the sidelink transmission. The reception component 1102 may receive, from the first UE, a retransmission of the sidelink transmission on a component carrier, of the plurality of component carriers, based at least in part on the HARQ feedback.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first user equipment (UE), comprising: transmitting, to a second UE, duplicated transmissions of a sidelink transmission on a plurality of component carriers based at least in part on a cast type associated with the sidelink transmission and one or more indications received from an upper layer of the first UE, wherein the duplicated transmissions are associated with the plurality of component carriers associated with a layer 2 (L2) destination identifier (ID) of the sidelink transmission.

Aspect 2: The method of Aspect 1, wherein the one or more indications from the upper layer indicate supporting or not supporting sidelink carrier aggregation for the L2 destination ID of the sidelink transmission.

Aspect 3: The method of any of Aspects 1 through 2, wherein the cast type is a groupcast or a broadcast, and wherein the L2 destination ID of the sidelink transmission is of the groupcast or the broadcast.

Aspect 4: The method of any of Aspects 1 through 3, further comprising: receiving, from a network node or a special UE, a configuration that configures a list of sidelink component carriers for the sidelink transmission associated to the L2 destination ID, wherein the plurality of component carriers are derived from the list of sidelink component carriers.

Aspect 5: The method of any of Aspects 1 through 4, further comprising: determining to duplicate the sidelink transmission on the plurality of component carriers based at least in part on at least one indication, of the one or more indications from the upper layer, indicating not supporting sidelink carrier aggregation.

Aspect 6: The method of any of Aspects 1 through 5, wherein transmitting the duplicated transmissions of the sidelink transmission comprises transmitting a duplication indication that indicates a presence of the duplicated transmissions.

Aspect 7: The method of any of Aspects 1 through 6, wherein the duplicated transmissions of the sidelink transmission are based at least in part on duplicated medium access control (MAC) protocol data units (PDUs), wherein the duplicated MAC PDUs are associated with the plurality of component carriers associated to the L2 destination ID, and wherein a duplication indication associated with the duplicated transmissions is in a MAC header of the duplicated transmissions.

Aspect 8: The method of any of Aspects 1 through 7, wherein the duplicated transmissions of the sidelink transmission are based at least in part on duplicated packet data convergence protocol (PDCP) packets, wherein the duplicated PDCP packets are for a plurality of logical channels mapped with the plurality of component carriers associated to the L2 destination ID, and wherein a duplication indication associated with the duplicated transmissions is in a PDCP header of the duplicated transmissions.

Aspect 9: The method of any of Aspects 1 through 8, further comprising: receiving, from the second UE, hybrid automatic repeat request (HARM) feedback based at least in part on the duplicated transmissions of the sidelink transmission; and retransmitting, to the second UE, the sidelink transmission on a component carrier, of the plurality of component carriers, based at least in part on the HARQ feedback.

Aspect 10: The method of any of Aspects 1 through 9, wherein an indication of the one or more indications corresponds to a transmitting (Tx) profile, and wherein the Tx profile is associated with a vehicle-to-everything or proximity services service identifier.

Aspect 11: A method of wireless communication performed by a second user equipment (UE), comprising: receiving, from a first UE, duplicated transmissions of a sidelink transmission on a plurality of component carriers based at least in part on: a cast type associated with the sidelink transmission, and one or more indications received from an upper layer of the second UE, and the one or more indications support sidelink carrier aggregation, wherein the duplicated transmissions are associated with the plurality of component carriers associated with a layer 2 (L2) destination identifier (ID) of the sidelink transmission.

Aspect 12: The method of Aspect 11, further comprising: receiving a duplication indication, with the duplicated transmissions of the sidelink transmission, that indicates a presence of the duplicated transmissions; and removing the duplicated transmissions based at least in part on the duplication indication.

Aspect 13: The method of any of Aspects 11 through 12, wherein the duplicated transmissions of the sidelink transmission are based at least in part on duplicated medium access control (MAC) protocol data units (PDUs), wherein the duplicated MAC PDUs are associated with the plurality of component carriers associated to the L2 destination ID, and wherein a duplication indication associated with the duplicated transmissions is in a MAC header of the duplicated transmissions.

Aspect 14: The method of any of Aspects 11 through 13, wherein the duplicated transmissions of the sidelink transmission are based at least in part on duplicated packet data convergence protocol (PDCP) packets, wherein the duplicated PDCP packets are for a plurality of logical channels mapped with the plurality of component carriers associated to the L2 destination ID, and wherein a duplication indication associated with the duplicated transmissions is in a PDCP header of the duplicated transmissions.

Aspect 15: The method of any of Aspects 11 through 14, further comprising: transmitting, to the first UE, hybrid automatic repeat request (HARQ) feedback based at least in part on the duplicated transmissions of the sidelink transmission; and receiving, from the first UE, a retransmission of the sidelink transmission on a component carrier, of the plurality of component carriers, based at least in part on the HARQ feedback.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:

a memory; and one or more processors, coupled to the memory, configured to:

provide, from an upper layer of the first UE to an access stratum (AS) layer of the first UE, a plurality of transmitting (Tx) profiles associated with a layer 2 (L2) destination identifier (ID) of a sidelink transmission, wherein:

each Tx profile, of the plurality of Tx profiles, indicates supporting or not supporting sidelink carrier aggregation for the L2 destination ID of the sidelink transmission;

each Tx profile, of the plurality of Tx profiles, indicates a backward compatibility of the sidelink transmission; and each Tx profile, of the plurality of Tx profiles, indicates one or more respective frequencies associated with a respective service type based at least in part on a respective mapping between a supported carrier and the respective service type associated to the L2 destination ID; and transmit, to a second UE, duplicated transmissions of the sidelink transmission on a plurality of component carriers based at least in part on a cast type associated with the sidelink transmission, the backward compatibility of the sidelink transmission, and one or more Tx profiles of the plurality of Tx profiles, wherein the duplicated transmissions are associated with the plurality of component carriers associated with the L2 destination ID of the sidelink transmission.

2. The apparatus of claim 1, wherein the cast type is a groupcast or a broadcast, and wherein the L2 destination ID of the sidelink transmission is of the groupcast or the broadcast.

3. The apparatus of claim 1, wherein the one or more processors are further configured to:

receive, from a network node or a special UE, a configuration that configures a list of sidelink component carriers for the sidelink transmission associated to the L2 destination ID, wherein the plurality of component carriers are derived from the list of sidelink component carriers.

4. The apparatus of claim 1, wherein the one or more processors are further configured to:

determine to duplicate the sidelink transmission on the plurality of component carriers based at least in part on at least one Tx profile, of the plurality of Tx profiles, indicating not supporting sidelink carrier aggregation.

5. The apparatus of claim 1, wherein the one or more processors, to transmit the duplicated transmissions of the sidelink transmission, are configured to transmit a duplication indication that indicates a presence of the duplicated transmissions.

6. The apparatus of claim 1, wherein the duplicated transmissions of the sidelink transmission are based at least in part on duplicated medium access control (MAC) protocol data units (PDUs), wherein the duplicated MAC PDUs are associated with the plurality of component carriers associated to the L2 destination ID, and wherein a duplication indication associated with the duplicated transmissions is in a MAC header of the duplicated transmissions.

7. The apparatus of claim 1, wherein the duplicated transmissions of the sidelink transmission are based at least in part on duplicated packet data convergence protocol (PDCP) packets, wherein the duplicated PDCP packets are for a plurality of logical channels mapped with the plurality of component carriers associated to the L2 destination ID, and wherein a duplication indication associated with the duplicated transmissions is in a PDCP header of the duplicated transmissions.

8. The apparatus of claim 1, wherein the one or more processors are further configured to:

receive, from the second UE, hybrid automatic repeat request (HARQ) feedback based at least in part on the duplicated transmissions of the sidelink transmission; and retransmit, to the second UE, the sidelink transmission on a component carrier, of the plurality of component carriers, based at least in part on the HARQ feedback.

9. The apparatus of claim 1, wherein the backward compatibility of the sidelink transmission indicates whether UEs not supporting sidelink carrier aggregation are capable of receiving the sidelink transmission.

10. A method of wireless communication performed by a first user equipment (UE), comprising:

providing, from an upper layer of the first UE to an access stratum (AS) layer of the first UE, a plurality of transmitting (Tx) profiles associated with a layer 2 (L2) destination identifier (ID) of a sidelink transmission, wherein:

each Tx profile, of the plurality of Tx profiles, indicates supporting or not supporting sidelink carrier aggregation for the L2 destination ID of the sidelink transmission;

each Tx profile, of the plurality of Tx profiles, indicates a backward compatibility of the sidelink transmission; and each Tx profile, of the plurality of Tx profiles, indicates one or more respective frequencies associated with a respective service type based at least in part on a respective mapping between a supported carrier and the respective service type associated to the L2destination ID; and transmitting, to a second UE, duplicated transmissions of the sidelink transmission on a plurality of component carriers based at least in part on a cast type associated with the sidelink transmission, the backward compatibility of the sidelink transmission, and one or more Tx profiles of the plurality of Tx profiles, wherein the duplicated transmissions are associated with the plurality of component carriers associated with the L2 destination ID of the sidelink transmission.

11. The method of claim 10, wherein the cast type is a groupcast or a broadcast, and wherein the L2 destination ID of the sidelink transmission is of the groupcast or the broadcast.

12. The method of claim 10, further comprising:

receiving, from a network node or a special UE, a configuration that configures a list of sidelink component carriers for the sidelink transmission associated to the L2 destination ID, wherein the plurality of component carriers are derived from the list of sidelink component carriers.

13. The method of claim 10, further comprising:

determining to duplicate the sidelink transmission on the plurality of component carriers based at least in part on at least one Tx profile, of the plurality of Tx profiles, indicating not supporting sidelink carrier aggregation.

14. The method of claim 10, wherein transmitting the duplicated transmissions of the sidelink transmission comprises transmitting a duplication indication that indicates a presence of the duplicated transmissions.

15. The method of claim 10, wherein the duplicated transmissions of the sidelink transmission are based at least in part on duplicated medium access control (MAC) protocol data units (PDUs), wherein the duplicated MAC PDUs are associated with the plurality of component carriers associated to the L2 destination ID, and wherein a duplication indication associated with the duplicated transmissions is in a MAC header of the duplicated transmissions.

16. The method of claim 10, wherein the duplicated transmissions of the sidelink transmission are based at least in part on duplicated packet data convergence protocol (PDCP) packets, wherein the duplicated PDCP packets are for a plurality of logical channels mapped with the plurality of component carriers associated to the L2 destination ID, and wherein a duplication indication associated with the duplicated transmissions is in a PDCP header of the duplicated transmissions.

17. The method of claim 10, further comprising:

receiving, from the second UE, hybrid automatic repeat request (HARQ) feedback based at least in part on the duplicated transmissions of the sidelink transmission; and retransmitting, to the second UE, the sidelink transmission on a component carrier, of the plurality of component carriers, based at least in part on the HARQ feedback.

18. The method of claim 10, wherein the backward compatibility of the sidelink transmission indicates whether UEs not supporting sidelink carrier aggregation are capable of receiving the sidelink transmission.

* * * * *